Patented Oct. 10, 1922.

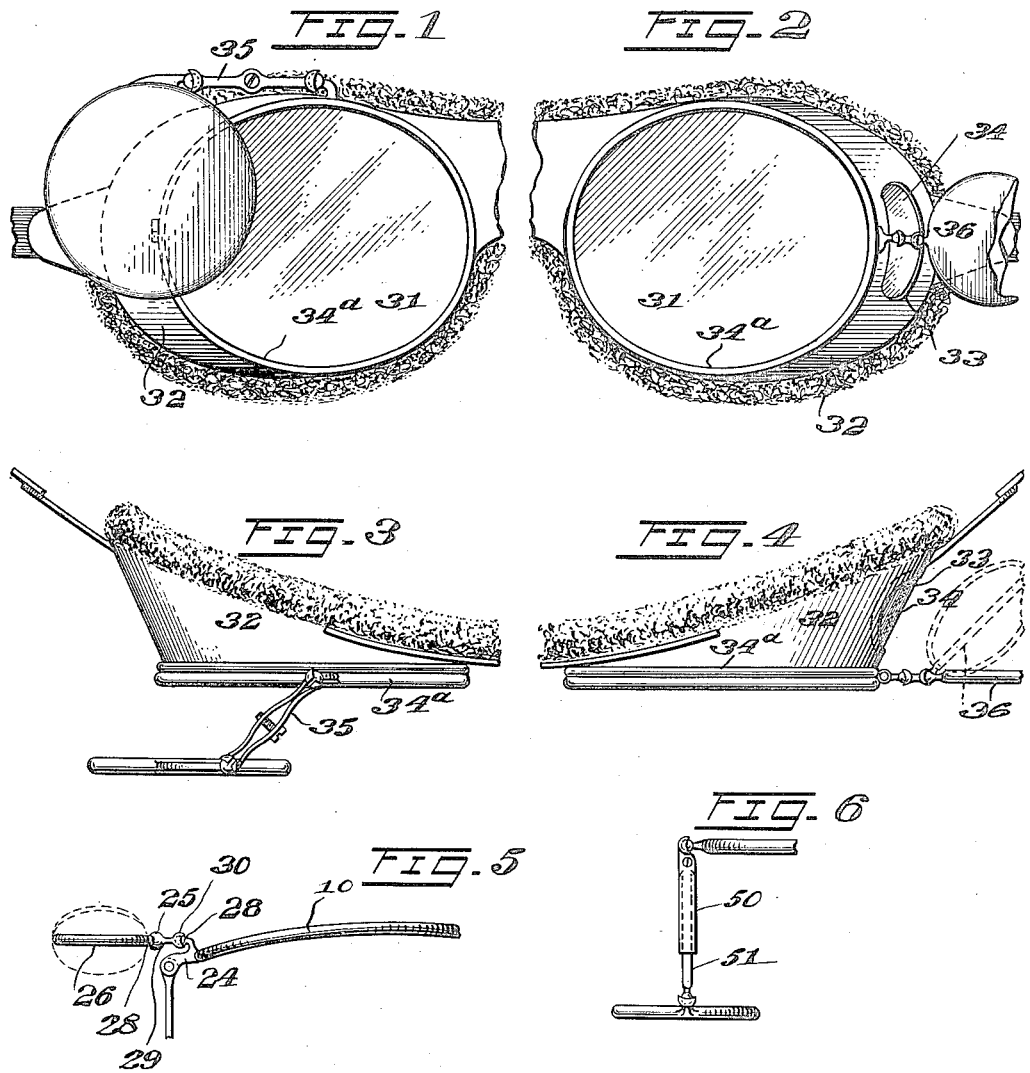

1,431,147

UNITED STATES PATENT OFFICE.

HELGE A. BORRESEN, OF CHICAGO, ILLINOIS.

REFLECTOR.

Application filed October 8, 1917. Serial No. 195,372.

*To all whom it may concern:*

Be it known that I, HELGE A. BORRESEN, a citizen of the United States, residing at Chicago, in the county of Cook and State of Illinois, have invented a certain new and useful Improvement in Reflectors, of which the following is a full, clear, concise, and exact description, reference being had to the accompanying drawings, forming a part of this specification.

The invention relates to reflectors, and particularly to that type which is applied to articles such as caps, glasses or goggles.

The object of the invention is to arrange the reflector so that the user may simultaneously observe traffic and objects at the back of him or at various other points.

It is an object to arrange the reflector so that the same may be adjusted to various positions to directly reflect objects or to utilize and arrange a plurality of the reflectors so that objects may be indirectly reflected to bring same within the vision of the user, the reflectors being either of the ordinary variety or may have enlarging or reducing qualities.

The invention is applicable to glasses in which the vision has been corrected and may when desired be applied directly thereon or be mounted in a supplemental frame which is fixed, removably or adjustably secured in position. This reflecting portion may be arranged in the same plane with the glass of the goggles or glasses, or may be arranged in a different plane in front or in the rear thereof, as found desirable.

The invention permits objects to be observed whether same are above, below or at the sides of the wearer which is of exceedingly great advantage when used by aviators, etc. It is a further object to accomplish these and other results in a simple and expeditious manner without resulting in a corresponding reduction in efficiency.

The invention will be more readily understood when read in conjunction with the accompanying drawings, in which—

Figure 1 is a front elevation of one part of a goggle having one form of which the invention is susceptible applied thereto.

Figure 2 is a view similar to Figure 1 showing a modified arrangement.

Figures 3 and 4 are plan views of the structures illustrated in Figures 1 and 2.

Figures 5 and 6 are modified arrangements which may be employed.

The structure shown contemplates the use of a universal connection between the reflector and the frame, upon which it is mounted. The object of this arrangement being the provision of a connection between these parts which lends itself to various adjustments so that objects at any point may be readily reflected and brought to the vision of the observer.

In Figs. 1 to 4 the reflector is shown as particularly adapted for use in connection with aviators' goggles, which are provided with the windows 31 and the protecting portion or housing 32 which extends from the windows against the face of the wearer. In the modification of the Figures 2 and 4 the portion 32 is provided with an aperture 33 and the transparent portion 34 which closes the same. The reflector in this instance is connected to the metal frame 34ª by a connection between this frame and the reflector which is similar to that illustrated in Fig. 5.

In the device shown in Fig. 1 the reflector is held by a comparatively long arm 35 which is preferably secured near the uppermost portion of the metal frame 34ª, substantially in the center thereof, this connection permitting the arm and reflector to assume and be held at various adjusted positions.

In the arrangement shown in Fig. 2 the reflector 36 may also be adjusted to various angular positions but differs in its point of connection with the frame, it being connected so that the observer may, by looking through the transparent closure 34 observe objects in a forward direction with absolutely no interference to his vision. It will be noted that the connection between this structure and the frame permits the reflector to be positioned so as to take in objects regardless of their position.

One of the great advantages obtainable by the connection described in these and the structure shown in Fig. 5, is that it permits one of the reflectors to be positioned at one angle to observe objects above and the other may be arranged to reflect objects below or at the side, thereby allowing the aviator to readily perceive all things transpiring near him, some of the various positions which this reflector may be adjusted to being shown in Fig. 4.

In Fig. 6 a means is shown whereby the distance between the reflector and the glass of the goggles may be varied. This means consists of the telescopic members 50 and 51, the member 50 being secured to the frame and the member 51 having the reflector attached thereto. This arrangement is of particular advantage to those whose sight would demand that this be adjustable for the proper focus to clearly bring out the reflected image.

While the means shown in Figure 5 is illustrated as being connected to the extension 24 which forms part of the pivot for the temples, the same may be positioned at any desired point depending upon the purpose for which same is to be utilized. This means 24 and the means 25 provided upon the reflector 26 each are provided with the balls 27 and 28, respectively. These parts are connected together by the connector 29 which has its ends provided with the sockets 30, into which the balls 27 and 28 are arranged. This construction frictionally holds the reflector in any of its various angular positions.

From the foregoing it can readily be seen that a simple and inexpensive arrangement has been produced whereby glasses or head gears can be provided with means whereby users such as chauffeurs, ship's captains, aviators, etc. may readily observe objects at the rear or other points, or same may be adjusted to reflect objects above and below, when occasion demands. The device will eliminate the necessity of reflectors being mounted upon the vehicle which demands the operator to move in the direction thereof, which would naturally cause his attention to be momentarily diverted. This might in some instances cause an accident which could be averted. By the arrangement shown and described only a side glance is necessary in order for the operator to see objects which would not ordinarily be seen when looking in a forward direction.

It is the intention to utilize the separate arrangements as shown and also to combine one with the other to form various combinations to attain the various advantages, depending upon the particular capacity in which the user is employed, as for instance, a motor vehicle driver will not demand a structure in which the reflectors are adjustable to view objects above and below, as would be the case with an aviator. It is also evident that constructions other than those herein shown and described may be resorted to in the production of the invention without departing from the spirit of the invention.

What I claim and desire to cover by Letters Patent is:

1. A device of the class described comprising in combination, a frame, a transparent member arranged in the frame, a reflector mounted on the frame, and a universal connection between said frame and reflector.

2. A device of the class described comprising in combination, a frame, a transparent portion arranged in the frame, a reflector mounted on the frame, and a universal joint connection, one end of which is secured to the frame, the opposite end of which is secured to the reflector whereby the reflector may be adjusted to various positions with regard to the frame.

3. In a device of the class described, the combination of a transparent member, a hood extending from one face of the transparent member, a reflector attached to the hood and a universal connection between the hood and the reflector, said connection including an arm the opposite ends of which are attached to the hood and reflector.

4. In a device of the class described, the combination of a transparent member, a hood extending from the transparent member, a reflector connected to the hood, said reflector being mounted for universal movement with relation to the hood.

5. In a device of the class described, the combination of a hood, a reflector, a universal connection between the hood and the reflector for supporting the reflector, and an aperture in the hood, said aperture and reflector being arranged to permit objects to be observed in the reflector through the aperture.

6. In a device of the class described, the combination of a hood, transparent members arranged in the hood, a reflector arranged upon the hood, and a universal connection between the hood and the reflector, said connection including resilient clamping arms the opposite ends of which are connected to the hood and the reflector.

7. In a device of the class specified the combination of a hood, a reflector arranged upon the hood, and an aperture in the hood, the aperture and reflector being arranged to permit the user to look through the aperture into the reflector, and a universal connection between the hood and the reflector.

8. In a device of the class described the combination of a hood, a reflector arranged upon the hood, an aperture in the hood, the aperture and reflector being arranged to permit the user to look through the aperture into the reflector, and a universal connection between the hood and reflector, said connection including clamping arms the opposite ends of which are connected to the hood and the reflector.

9. In a device of the class described comprising in combination a frame, a transparent element arranged in the frame, a reflector mounted on the frame, and an extensible element permitting the reflector to be moved in a direction which is transverse to the transparent element.

In witness whereof, I hereunto subscribe my name this day of October, A. D., 1917.

HELGE A. BORRESEN.